United States Patent

Kim et al.

[11] 3,975,362
[45] Aug. 17, 1976

[54] LOW TEMPERATURE REVERSION RESISTANT ORGANOSILICON POLYMERS

[75] Inventors: Yung K. Kim; Michael O. Riley, both of Midland, Mich.

[73] Assignee: Dow Corning Corporation, Midland, Mich.

[22] Filed: Apr. 28, 1975

[21] Appl. No.: 572,583

[52] U.S. Cl. .................... 260/46.5 G; 260/46.5 UA
[51] Int. Cl.² ........................................ C08G 77/04
[58] Field of Search ............. 260/46.5 UA, 46.5 G, 260/37 SB

*Primary Examiner*—Lewis T. Jacobs
*Attorney, Agent, or Firm*—Robert F. Fleming, Jr.

[57] ABSTRACT

Polymers which are flexible down to $-40°F$. and which do not depolymerize appreciably when heated in a closed space at $500°F$. or above have the structure

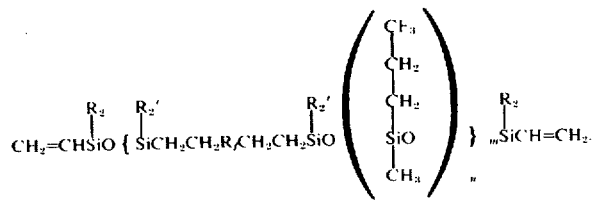

These polymers can be cured to rubbers which are solvent resistant and are flexible over a wide temperature range. Such rubbers are useful for sealing aircraft fuel tanks.

6 Claims, No Drawings

LOW TEMPERATURE REVERSION RESISTANT ORGANOSILICON POLYMERS

BACKGROUND OF THE INVENTION

Organosilicon polymers containing the structure

and copolymers of these with II $R_2SiO$ siloxane units are shown in U.S. Pat. Nos. 3,542,830 and 3,647,740. The entire disclosure of said patents being incorporated herein by reference. Those polymers containing substantially only I type units have excellent reversion resistance (i.e. they do not depolymerize when subjected to heat in confined space) as compared with polymers containing II type units. However, the brittle point of polymers made up of I type units is in the range of about −21° to −25°F. (29° to −31°C.), whereas the brittle point of polymers made up of II type units can be in the range of −80°F. (−62°C.) or below. Consequently, although the I type polymers have better reversion resistance, their operability is limited to a narrower temperature range than conventional organopolysiloxanes. For that reason, it would be highly desirable to produce polymers which have in combination the high reversion resistance of the heretofore known I type polymers and superior low temperature flexibility. It has been found that this can be accomplished by producing polymers of the particular structure claimed below.

It is the object of this invention to provide polymers which give the best combination of low temperature properties and reversion resistance without sacrificing high temperature stability and solvent resistance of the heretofore known type I polymers.

BRIEF DESCRIPTION OF THE INVENTION

This invention relates to siloxane copolymers of the formula

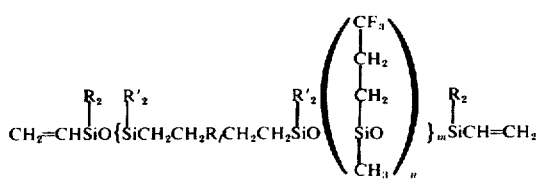

in which R and R' are independently a methyl or a trifluoropropyl radical, $R_f$ is a perfluoroalkylene radical of from 2 to 10 carbon atoms, $n$ has an average value of from 1 to 2 and $m$ has an average value of at least 1.

DETAILED DESCRIPTION OF THE INVENTION

Hereinafter the group $-CH_2CH_2R_fCH_2CH_2-$ shall be referred to as the Y radical. The polymers of this invention operate for the intended purpose because they have a structure in which the

units alternate with the trifluoropropylmethyl units and in which structure there is on the average no more than two trifluoropropylmethyl units connected to each other. Because of this structure, excellent reversion resistance is obtained combined with superior low temperature properties. If the polymers are prepared by a process in which trifluoropropylsiloxane units are linked haphazardly in the chain, reversion resistance is poor. This type of polymer is referred to hereinafter as random copolymers. In order to ensure the preparation of alternating polymers of the instant type, it is necessary to couple the various reactants under conditions in which little or no randomness occurs. This is best accomplished by reacting diols of the formula

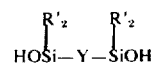

with silanes of the type

in which X is a group which readily reacts with a silanol group. Thus, for the purpose of this invention, the X group can be alkoxy, particularly methoxy; acyloxy, particularly acetoxy, amino such as dimethylamine, ketoxime such as $-ON=CR'_2$ where R' is methyl or ethyl, aminoxy such as $-ONR'_2$ where R' is methyl or ethyl and amido groups such as the $-NCH_3C=OCH_3$. The latter groups are preferred. The third reactant is a compound of the formula $CF_3CH_2CH_2(CH_3)SiX_2$ in which X is as defined above. Here, again, the preferred X is an amido group.

The polymers are best prepared by first reacting the diol with the vinyl silane under conditions in which the X group reacts with the hydroxyl producing an HX by-product. In general, this merely requires bringing the two in contact although heating can be used if desired. The proportion of vinylsilane with the diol depends upon the ultimate degree of polymerization desired in the final product. Obviously, the higher the mole ratio of the endblocking vinylsilane, the lower will be the degree of polymerization of the finished product. By varying the mole ratio of silane and diol, the value of $m$ can be varied from say 5 to 300 or more.

After the coupling of the diol with the vinylsilane to give a partially endblocked material, the reactive trifluoropropylmethylsilane is then added and the coupling is continued. Since this is a difunctional material, polymerization takes place via the formation of the HX groups. In general, this reaction is carried out at temperatures ranging from room temperature to 100°C. or above for periods from 1 hour to 1 day or longer.

When there is one trifluoropropylmethyl unit per I type unit, one reacts one mole of trifluoropropylmethyl $SiX_2$ with one mole of the diol. When one wishes to prepare a polymer where $n$ is 2, the best method is to employ as a coreactant the disiloxane of the formula $\{X(CF_3CH_2CH_2)(CH_3)Si\}_2O$. This disiloxane is reacted with the partially endblocked diol in the manner shown above. When one wishes to have a value of $n$ intermediate between 1 and 2, one can employ mixtures of the trifluoropropylmethylsilane and the trifluoropropylmethyldisiloxane.

To ensure complete endblocking with the

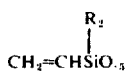

units, one should treat the polymer with additional vinylsilane or disiloxane, after reaction with trifluoropropylmethylsilane has been completed. The post treatment ensures that the resulting polymer can be cured.

For the purpose of this invention $R_f$ can be any perfluoroalkylene radical of from 2 to 10 carbon atoms such as, for example, $-CF_2CF_2-$, $-CF_2CF_2CF_2C-F_2-$, $-(CF_2)_6-$ and $-(CF_2)_{10}-$.

The polymers of this invention can be cured to elastomeric products by crosslinking them with any crosslinker which is reactive with the vinyl group on the ends of the chain. Typical examples of such crosslinkers are polyvinylsiloxanes; i.e., those containing at least three vinyl groups per molecule in which case the crosslinking is effected by way of peroxide cure or irradiation or polyfunctional SiH containing siloxanes in which there is at least three SiH groups per molecule. The latter type crosslinker is preferred but regardless of the type of crosslinker, the molecular weight of the crosslinking agent should be as low as possible in order to reduce the reversion of the crosslinked product. This is true because the more siloxane linkages one has in the cured product, the more likely it is to deteriorate when heated in a closed space. For the purpose of this invention the crosslinker can contain besides vinyl and hydrogen, heat stable silicon substituents such as methyl, trifluoropropyl, phenyl and the like. The preferred crosslinker is a polyfunctional trifluoropropylmethyl SiH containing siloxane and the preferred catalysts for this reaction are any of the well known Pt catalysts.

If desired, the polymers of this invention can be formulated with various other ingredients such as fillers, such as metal oxides, silica, diatomaceous earth, glass fibers, etc. which are commonly employed with organosilicon elastomers. The polymers can also contain thermal stability additives such as carbon black, ferric oxide and the like.

The compositions of this invention whether cured or uncured are particularly applicable for use in sealing of fuel tanks and particularly those on high speed aircraft.

The following examples are illustrative only and should not be construed as limiting the invention which is properly delineated in the appended claims.

EXAMPLE 1

This example shows a one to one ratio of type I and type II units. To 60 g. (0.128 moles of (1)

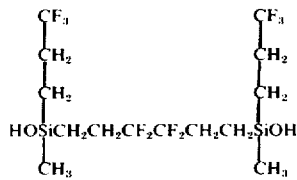

was added 2.83 g. (0.180 moles) of (2)

in three grams of toluene. The addition took place dropwise with vigorous agitation and stirring was continued at room temperature over the weekend under slight positive pressure of nitrogen. 34.27 g. (0.1206 moles) of (3)

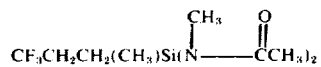

was added dropwise to the stirred product. There was a slight exotherm. The mixture was stirred for about 24 hours, then dissolved in ether and washed with saturated sodium chloride solution and then with distilled water. After drying the ether layer over calcium sulfate the ether was removed to give 82 g. of a viscous fluid. The stripped copolymer was then treated with an additional 1.4 g. of (2) and stirred overnight. The polymer was dissolved in ether and washed as above. The final product was stripped at 135° to 140°C. at 0.7 mm. for 24 hours. No low boiling material was obtained. The product was a copolymer having the average formula

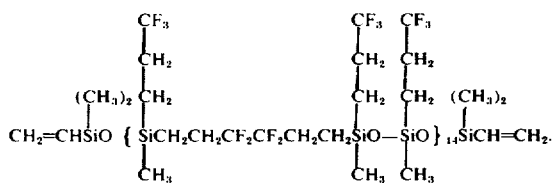

EXAMPLE 2

This example shows a ratio of 1.5 to 1 of II to I.

70 g. of (0.149 moles) of the diol (1) of Example 1 was reacted with 3.65 (0.0232 moles) of silane (2) of Example 1 in the same manner. To this product was added slowly a mixture of 19.55 g. (0.06875 moles) of (3) of Example 1 and 30.29 g. (0.06875 moles) of

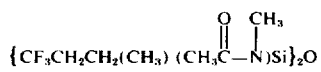

and the product was worked up as in Example 1. The copolymer was then treated with an additional 1 g. of (2) and the final product was stripped at 140°C. at 0.5:1 mm. 59 g. of a viscous liquid copolymer was obtained having the average formula

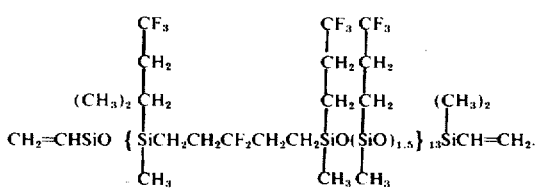

EXAMPLE 3

This is an example of a copolymer of 2 to 1 ratio of II to I.

71 g. (0.1505 moles) of (1) of Example 1 was reacted with 3.14 g. (0.0200 moles) of (2) as in that example and the product was then reacted with 62.68 g. (0.1405 moles) of

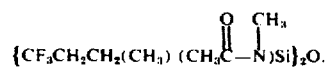

Finally the polymer was reacted with an additional 0.5 g. of (2) and stripped at 130°C. at 0.5 to 1 mm. leaving a viscous fluid residue of 38 g. which had the average formula

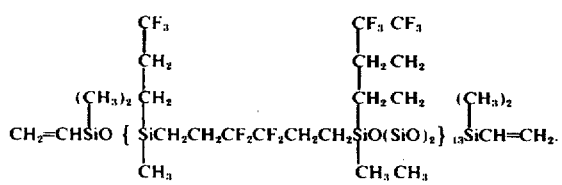

EXAMPLE 4

For comparison a random copolymer was prepared in the following manner. In a dry flask was loaded a mixture of 2.29 g. (0.019 mole) of vinyldimethylchlorosilane and about 30 g. of trifluoropropylmethyldichlorosilane. 63.9 g. (0.136 moles) of (1) of Example 1 was added dropwise under a slow nitrogen sweep with a rapid stirring. After about half of the diol had been added, 33.2 g. (0.299 moles) additional trifluoropropylmethyldichlorosilane was added directly to the reaction mixture. Then the remaining (1) was added. After this reaction was complete, the flow of nitrogen was increased and the mixture was heated to about 100°C. for 4.5 hours and at 60°C. overnight. The reaction mixture was cooled, dissolved in ether and hydrolyzed with aqueous sodium bicarbonate. The organic layer was separated and dried over calcium sulfate, filtered and stripped. The prepolymer was then condensed by heating in the presence of 10 drops of tetramethyl guanidine-trifluoroacetic acid at 100°C. in vacuum. The resulting polymer was dissolved in ether, washed successively with aqueous sodium bicarbonate and aqueous sodium chloride and then dried over a dehydrating agent. After removal of the ether, a portion of the viscous polymer was stripped at 140°C. at 0.07 mm. During the stripping operation, trifluoropropylmethyl cyclic siloxanes came off. An examination of the resulting polymer by N.M.R. indicated that the degree of polymerization was about 32 and that there was an average of from 1 to 1.1 trifluoropropylmethylsiloxane units to 1 type unit. The polymer, of course, was endblocked with vinyldimethylsiloxy units.

EXAMPLE 5

Each of the polymers shown above was compounded and cured in accordance with the procedure shown below with the results shown in the table below. In each case, 100 parts by weight polymer was mixed with 10 parts by weight of a precipitated silica, 2 parts by weight carbon black, 2 drops of methylbutynol inhibitor and the amount of crosslinker shown in the table below. Last, the Pt catalyst was added in the amount shown below. The crosslinker employed had the structure

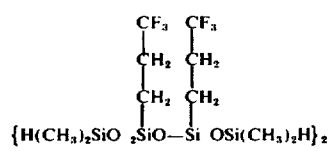

and the catalyst employed was platinum catalyst. In each case, the mixture was milled on a three roll mill or stirred in a Baker Perkins mixer, deaired in a beaker for 30 minutes at 0.1 mm. and deaired again in a chaise mold for 30 minutes. The product was then cured at 90° to 130°C. at 4,000 p.s.i. for 15 to 20 minutes. The cured elastomer was then removed from the mold and postcured by heating 24 hours at 135°C. in an air circulating oven. The glass transition temperature* of each sample and the tensile and elongation were determined by standard procedures. A sample was then wrapped in a film of polytetrafluoroethylene and then in aluminum foil and placed in a closed container and heated 24 hours at 540° to 550°F. The sample was then removed and the tensile and elongation determined. The results are shown in the table below:

*Determined using a differential scanning calorimeter cell. The sample is frozen in liquid $N_2$ and warmed at a rate of 10°C. per minute. The Tg is shown by a discontinuity in the temperature curve.

| Polymer | Catalysts | Crosslinker | Tg°F. | Original Tensile and Elongation | | After 24 Hrs. at 540 to 550°F. (282 to 288°C.) | |
|---|---|---|---|---|---|---|---|
| | | | | Tensile p.s.i. | Elongation at Break % | Tensile p.s.i. | % Elongation at Break |
| Example 1 | 8 drops | 1.70 g. | −38 (−38.9°C.) | 385 | 360 | 384 | 325 |
| Example 2 | 8 drops | 1.57 g. | −40 (−40°C.) | 183 | 119 | 120 | 283 |
| Example 3 | 7 drops | 1.51 g. | −40 (−40°C.) | 178 | 138 | 97 | 315 |
| Example 4* | 5 drops | 0.82 g. | −38 (−38.9°C.) | 304 | 320 | Complete Reversion | |

*Random copolymer for purposes of comparison.

By comparison, a polymer having the formula

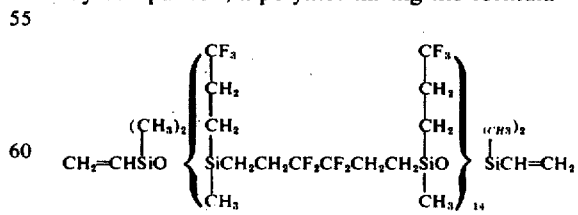

which was cured in an identical manner had a Tg of −21°±3°F. (29.4°C.).

Any of the brittle paints shown in the table below can vary over 3° to 4°F. range. The results shown in the table are average values.

EXAMPLE 6

When the following reactants are substituted in the procedure of Example 1, the following products are obtained In each case (3) was the same as in Example 1. Vi is the vinyl radical, Me the methyl radical and Pr is the $CF_3CH_2CH_2-$ radical.

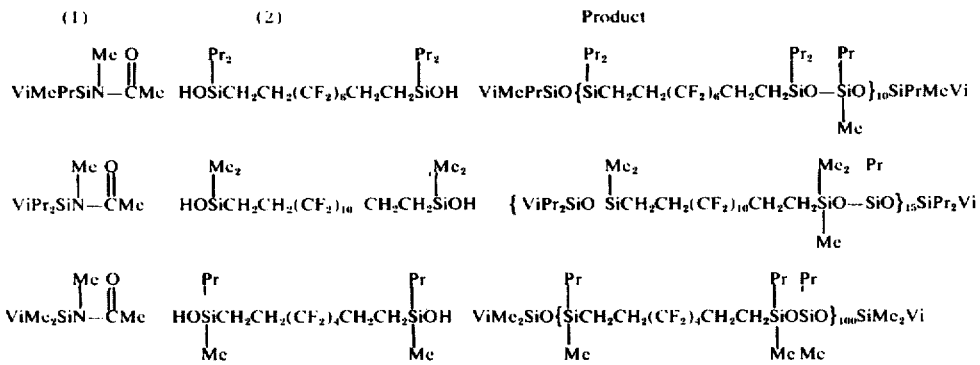

That which is claimed is:

1. A siloxane copolymer of the average formula

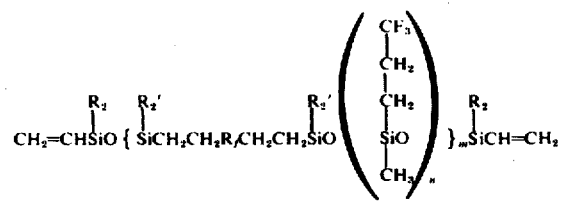

in which

R and R' are independently methyl or $CF_3CH_2CH_2-$,
$R_f$ is a perfluoroalkylene radical of 2 to 10 carbon atoms,
$n$ has an average value of from 1 to 2, and
$m$ has an average value of at least 1.

2. A copolymer of claim 1 in which R groups are methyl, one R' is methyl and the other $CF_3CH_2CH_2-$ and $R_f$ is $-CF_2CF_2-$.

3. A composition of matter comprising a cured polymer of claim 1 and a filler.

4. The cured composition of claim 3 in which both R groups are methyl, one R' is methyl and the other $CF_3CH_2CH_2-$ and $R_f$ is $-CF_2CF_2-$.

5. A curable composition consisting essentially of a copolymer of claim 2, a crosslinker of the formula $CF_3CH_2CH_2'H(CH_3)_2SiO'_2Si\text{-}OSi'OSi(CH_3)_2H'_2CH_2CH_2CF_3$ and a Pt catalyst.

6. The cured composition of claim 5.